United States Patent Office 3,467,641
Patented Sept. 16, 1969

3,467,641
POLYMERIZATION PROCESS
Arkle D. Taylor, Tallmadge, Ohio, assignor to The Goodyear Tire & Rubber Company, Akron, Ohio, a corporation of Ohio
No Drawing. Filed Feb. 2, 1967, Ser. No. 613,419
Int. Cl. C08d *1/14, 3/04;* C08c *11/44*
U.S. Cl. 260—94.3
8 Claims

ABSTRACT OF THE DISCLOSURE

A process of producing high cis 1,4 polymers of good color from 2-alkyl substituted 1,3-butadiene is disclosed. The process is the polymerization of 2-alkyl 1,3-butadiene by means of organoaluminum compounds/titanium halides catalysts wherein the polymer chain growth reaction is stopped or terminated by means of alkali metal alcoholates or alkali metal hydroxides in mixture with small quantities of triisopropanolamine. The triisopropanolamine is added simultaneously with the alkali metal alcoholates or hydroxides or immediately subsequent to their addition. The effect of the combination of triisopropanolamine and alkali metal alcoholates or alkali metal hydroxides is to produce a stable and improved lightcolored polymer.

---

This invention relates to the preparation of high cis-1,4 poly 2-alkyl-1,3-butadienes with improved and stable light color. It relates to a method of color improvement of such polymer comprising the addition of small quantities of triisopropanolamine to the polymer, either simultaneously with or subsequent to the chain termination process which is effected by the use of alkali metal alcoholates or alkali metal hydroxides. This invention will be described in connection with the solution polymerization of 2-alkyl 1,3-butadienes in an inert liquid organic medium to form the corresponding high cis-1,4 polymers by means of certain stereospecific catalysts such as mixtures of titanium tetrachloride and organoaluminum aromatic etherates or mixtures of titanium tetrachloride and organoaluminum compounds.

Desirable features of a finished polymer of high cis-1,4 poly 2-alkyl 1,3-butadienes include a light color approaching a whiteness, and the ability of the polymer to retain this light color not only after prolonged exposure of the raw polymer to ultraviolet light, particularly sunlight, but also during and after the critical conditions encountered in compounding, processing and curing.

Previous processes using similar stopping materials but not in combination have resulted in polyisoprene-type polymers with increased molecular weight and temporary improvements in color. In the case of high cis 1,4 poly 2-alkyl 1,3-butadiene, increased molecular weight is undesirable because of the difficulties encountered in processing very high molecular weight polymers. The use of polyamines as the sole chain stopper has led to polymer color problems. Tetraethylene pentamine (TEPA), as a chain stopper with polyisoprene, produces a polymer of dark color. Triisopropanolamine, however, when used alone as the sole chain terminator and antioxidant, produces a light-colored polyisoprene but must be used in amounts twenty times the most optimum amount of the present invention. Relative to the alkali metal alcoholates and alkali metal hydroxides, triisopropanolamine (TIPA) is a very expensive material.

It is, therefore, an object of this invention to produce a finished high cis-1,4 poly 2-alkyl-1,3-butadiene type polymer with a good initial light color. Another object is to produces a finished high cis-1,4 poly 2-alkyl 1,3-butadiene type polymer with lasting light color after sustained exposure to the ultraviolet rays of sunlight. Another object is to produce a light colored polymer using relatively inexpensive anti-yellowing materials. Another object is to produce a finished high cis-1,4 poly 2-alkyl 1,3-butadiene type polymer with no undesirable increase in molecular weight. Another object is to produce a finished lightcolored polyisoprene type polymer using antiyellowing materials which have no significant effect on the cure rate of the finished polymer. Another object is to provide a method whereby such improved polymers are produced. Other objectives will appear as the description proceeds.

The invention is an improvement in a process for polymerizing a 2-alkyl 1,3-butadiene to form a high cis 1,4 poly 2-alkyl 1,3-butadiene type polymer which comprises contacting a 2-alkyl 1,3-butadiene in an inert solvent under polymerization conditions with a catalyst system selected from the group consisting of (1) a mixture of titanium tetrachloride and at least one organoaluminum compound and (2) a mixture of titanium tetrachloride and at least one organoaluminum aromatic etherate which improvement comprises stopping the chain growth reaction by the addition of at least one material selected from the group consisting of alkali metal alcoholates and alkali metal hydroxides, and the addition of small amounts of triisopropanolamine. The triisopropanolamine can be added simultaneously with the chain stopper addition or immediately subsequent to chain stopper addition, thereby producing a light-colored, sunlight stable, high cis 1,4 poly 2-alkyl 1,3-butadiene polymer, and recovering the same high cis 1,4-polymer.

The catalyst systems employed to polymerize 2-alkyl-1,3 butadiene to high cis-1,4 poly 2-alkyl 1,3-butadiene is, as indicated above, a mixture of organoaluminum compounds and titanium tetrachloride, or a mixture of organoaluminum aromatic etherates and titanium tetrachloride.

The preferred organoaluminum compounds which along with titanium tetrachloride comprise one of the catalyst systems of this invention may be represented by the formula

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyls), aryl and aralkyl radicals. Representative of and by no means limiting such organoaluminum compounds are: dimethyl aluminum chloride, diethyl aluminum chloride, di-n-propyl aluminum chloride, di-n-butyl aluminum chloride, diisobutyl aluminum chloride, dihexyl aluminum chloride, dioctyl aluminum chloride, diphenyl aluminum chloride, dioctyl aluminum bromide, di-n-propyl aluminum bromide, di-n-butyl aluminum bromide, diisobutyl aluminum bromide, diethyl aluminum iodide, di-n-propyl aluminum iodide, di-n-butyl aluminum iodide, diisobutyl aluminum iodide and other organo aluminum halides. Also included are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenylethyl aluminum hydride, phenyl-n-propyl aluminum hydride, p-tolylethyl aluminum hydride, p-tolyl-n-propyl aluminum hydride, p-tolylisopropyl aluminum hydride, benzylethyl aluminum hydride, benzyl-n-propyl aluminum hydride, benzylisopropyl aluminum hydride and other organo aluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl-diphenyl aluminum, ethyldi-p-tolyl aluminum, ethyldibenzyl aluminum, diethylphenyl aluminum, diethyl-p-tolyl aluminum, diethylbenzyl aluminum and other tri-organo aluminum compounds.

The organo aluminum aromatic etherates which along with titanium tetrachloride comprise one of the catalyst systems of this invention may be defined by the formula

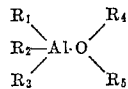

wherein $R_1$ is selected from the group consisting of alkyl (including cycloalkyl), aryl, aralkyl and halogen radicals and hydrogen; $R_2$ and $R_3$ are selected from the group consisting of alkyl (including cycloalkyl), aryl and aralkyl radicals; $R_4$ is an aromatic radical and $R_5$ is selected from the group consisting of saturated aliphatic, unsaturated aliphatic, alicyclic, unsaturated alicyclic and aromatic radicals. The term "aromatic radicals" is intended to include such materials as phenyl radicals and naphthyl radicals. These organoaluminum aromatic etherates are usually prepared by the reaction of the organoaluminum compounds set forth previously and aromatic etherates. These aromatic ethers may be defined by the formula $R_4$—O—$R_5$ wherein $R_4$ is an aromatic radical and $R_5$ is selected from the group consisting of saturated aliphatic, unsaturated aliphatic, saturated alicyclic, unsaturated alicyclic and aromatic radicals. The term aromatic radical is intended to include both phenyl and naphthyl. Mixtures of these ethers may also be used to prepare the organoaluminum aromatic etherates. Representative of and by no means limiting such ethers are: phenyl ether, naphthyl ether, anisole, phenetole, para methyl anisole, cyclohexyl phenyl ether, cyclohexyl naphthyl ether, vinyl phenyl ether, allyl phenyl ether, anethole, estragole, alpha and beta naphthyl methyl ethers, alpha and beta naphthyl ethyl ethers, biphenyl ether, veratrole, safrole, isosafrole, asarone, myristicin, apiole, p-phenyl anisole and also ethers such as para chloro anisole, para fluoro anisole, chlorophenyl ether and fluorophenyl ether may also be used.

As may be seen from the list of representative aromatic ethers recited above, the substituted aromatic ethers may also be employed so long as the substituents do not, themselves, react or interfere in a manner to destroy, weaken or affect catalyst activity. Representative of such inert substituents are alkyl and aryl radicals and other organic and inorganic radicals which are known to be inert when substituted for the hydrogens of the aromatic ethers.

The organo aluminum aromatic etherates which are one component of the catalysts of this invention may be prepared by conventional procedures. The organo aluminum aromatic etherates may be prepared by directly reacting an aluminum magnesium alloy with an alkyl bromide in the presence of a particular aromatic ether. These procedures are straight forward and well known. Other methods of preparing these organoaluminum aromatic etherates may also be employed. One convenient method is to mix approximately equal molar quantities of the desired aromatic ether with the desired organoaluminum compound. Mixtures of the organoaluminum compounds and the aromatic ethers listed above may be used to prepare the organoaluminum aromatic etherates. When prepared in this manner the compounds are usually dissolved in an inert hydrocarbon solvent (a term more fully described below) for ease of handling and accurate measurement. Therefore, for convenience, the final organoaluminum aromatic etherate is usually employed as solution in an inert hydrocarbon solvent.

As indicated by the specific representative illustrations of ethers above, the aromatic ethers employed in this invention may contain more than one ethereal oxygen. When the particular aromatic ether used does contain more than one ethereal oxygen atom, the amount of the organoaluminum compound and the amount of aromatic ether used should be based on the C—O—C groups contained in the particular aromatic ether rather than on the equal molar amount suggested previously. This is due to the fact that each ethereal oxygen atom will form a bond to the aluminum of the organoaluminum compound in the manner suggested by the discussion and formula previously set forth. Therefore, to form an organoaluminum etherate of a di- or tri-aromatic ether, the amounts used are dependent directly on the ethereal oxygen and aluminum atoms rather than the mol weights of the materials employed.

Representative of the organoaluminum aromatic etherates useful in this invention are those aromatic etherates listed above coupled with the organoaluminum compounds listed above. For the sake of brevity, these will not be specifically repeated in this specification.

The titanium tetrachloride, which is reacted with either the organoaluminum aromatic etherates or the organoaluminum compounds, cited above, to form the catalysts of this invention does not require any discussion. It should, of course, be anhydrous and as pure as possible, the reason being that moisture has—and other impurities may have—a deleterious effect on the finished catalysts.

The titanium tetrachloride-organoaluminum compound catalyst system or the titanium tetrachloride-organoaluminum aromatic etherate catalyst system of this invention may be prepared by direct mixing of the organoaluminum compounds or organoaluminum etherates of aromatic ethers and the titanium tetrachloride. This may be done while these materials are in contact with the monomer to be polymerized or the mixing may take place in the absence of the monomer. The catalyst components may be mixed in bulk or they may be dissolved in an inert solvent (a term more fully explained hereinafter) and mixed as solutions. They may also be prepared by continuous catalyst make-up procedures. One of the more preferred methods of preparing the catalyst of this invention is to mix the two components of the catalyst while they are dissolved in an inert solvent in the absence of the monomer (a procedure which may be termed "preformed" or "preforming"). The ratio of organoaluminum aromatic etherates or organoaluminum compounds to titanium tetrachloride employed in the practice of this invention may vary between a mol ratio of aluminum to titanium (Al/Ti) of 0.5/1 to 2.0/1. A more preferred mol ratio of Al/Ti is from 0.6/1 to 1.5/1. Very good catalysts have been prepared from organoaluminum phenyl etherates and titanium tetrachloride at mol ratios of Al/Ti of 0.8/1 to 1.2/1. The temperature employed in the preparation of these catalysts is not critical and may vary between such extremes as −40° C. and 60° C. When an inert solvent is employed as a carrier for each catalyst component, in order to obtain good mixing, accurate measurement and proper temperature control, the concentration of the catalyst components in the solvent is most usually adjusted so that the concentration of titanium in the finished catalyst is between 0.2 and 0.9 mols per liter.

The amount of catalyst employed to polymerize the 2-alkyl-1,3-butadienes according to the practice of this invention, of course, depends upon a number of factors— the rate desired, temperature employed and other conditions all of which have an effect. However, the catalytic concentrations may vary broadly between 0.01 and 2 parts by weight calculated as titanium tetrachloride originally employed to make the catalyst per 100 parts by weight of monomers (p.h.m.) to be polymerized. A more preferred range of 0.05 to 1.0 of titanium tetrachloride p.h.m. is usually employed.

In general the 2-alkyl-1,3-butadienes employed in the practice of this invention are polymerized in the presence of the aforementioned catalyst system while these monomers are dissolved in an inert diluent or solvent. By the term "inert" diluent or solvent—whenever employed in this application—is meant that the solvent or diluent does not enter into the structure of the resulting polymer, does not adversely affect the properties of the resulting polymer nor does it have any adverse effect on the activity of the finished catalyst or the components from which the catalyst is prepared. Usually the inert solvents or diluents useful for this purpose are organic hydrocarbons, representative of which but not limiting are: paraffinic hydrocarbons such as pentane, hexane, heptane, octane and isooctane; the acyclic hydrocarbons such as cyclohexane and the like and the aromatic hydrocarbons such as benzene, toluene and xylene. Mixtures of any of these hydrocarbons may also be employed. Substituted hydrocarbons may also be employed so long as the substituents are themselves inert under the conditions of the polymerization. Representative of such substituents are alkyl and aryl radicals and other organic and inorganic substituents which are known to be inert when attached to aromatic rings. Of these inert solvents or diluents the paraffinic or saturated hydrocarbons such as pentane and heptane are usually preferred. The solvent/monomer volume ratios employed have not been found to be critical and may be varied over comparatively wide ranges. For instance up to 20 or more/1 volume ratio of solvent to monomer can be employed. Usually it is preferred to utilize a solvent/monomer volume ratio of about 3 to 6/1. The polymerizations to which this invention is directed may also be carried out in the absence of inert solvents or diluents. This technique is known as bulk or mass polymerization which practice is well known to the art. Continuous polymerization processes may also be employed.

In conducting the polymerizations of this invention, it is usually desirable to employ air-free and moisture-free techniques. The organoaluminum aromatic etherates-titanium tetrachloride complex and organoaluminum compound-titanium tetrachloride complex catalysts of this invention are somewhat sensitive to the effects of oxygen and moisture, these materials being detrimental to catalyst activity and in some cases to the polymer formed. These techniques, however, are well known in the polymerization art and, therefore, will not be discussed here in great detail.

The temperatures employed during the polymerizations of this invention may vary broadly between the extremes of −10° C. or lower up to 90° C. or higher and thus are not critical. It has usually been the practice, however, to employ more convenient temperatures ranging from about 10° C. to about 50° C.

The alkali metal compounds which are added as stopping agents to the reaction mixture after the desired level of polymerization is achieved, are selected from the group consisting of alkali metal alcholates and alkali metal hydroxides. The alkali metal alcoholates may be represented by the formula MOR, wherein M is an alkali metal, representative of which are lithium, sodium, potassium, rubidium and cesium, and R represents alkyl, cycloalkyl, aryl, aralkyl, or alkaryl radicals which contain preferably from 1 to 20 carbon atoms. Representatives of suitable R radicals include methyl, ethyl, n-propyl, isopropyl, butyl, isobutyl, tertiary butyl, n-pentyl, n-hexyl, dodecyl, tridecyl, cyclopentyl, cyclohexyl, methyl-cyclohexyl, phenyl benzyl, 4-tolyl, 2,4,6-trimethyl phenyl, 2-phenyl ethyl, 1-naphthyl and 2-naphthyl. The alkali metal hydroxides may be represented by the formula MOH wherein M represents an alkali metal as previously described, O is oxygen and H is hydrogen. Although any of the alkali metal hydroxides can be used in the practice of the process, sodium, potassium, and lithium hydroxides are preferred.

The alkali metal alcoholates and alkali metal hydroxides may be added in any form. However, they are more conveniently added to the reaction mixture as solutions or suspensions. It is usually preferred to add them as a solution in an alcohol. Representative of suitable alcohols are methyl, ethyl, n-propyl, isopropyl, n-butyl, sec. butyl, tertiary butyl and hexyl alcohols.

The amount of alkali metal alcoholate or alkali metal hydroxide which is preferably used as a stopping agent is usually calculated with reference to the amount of titanium present in the catalyst system. From 0.5 to 40.0 mols of alkali metal alcoholate or alkali metal hydroxide per mol of titanium have been used with success. A more preferred ratio is about 2 to about 6 mols of stopping agent per mol of titanium. If the stopping agent is added to the reaction mixture as an alcohol solution, the concentration of the stopping agent may vary from a very dilute solution of 0.5 percent to a concentrated solution of 50 percent by weight. Although there is no upper or lower limit to the concentration of alcoholic alkoxide or alcoholic hydroxide solutions which may be used, it has been found that a 25 percent solution is a convenient concentration to use.

The triisopropanolamine (TIPA) added in conjunction with the alkali metal compounds makes for the great improvement in color and is the essence of the present invention. The TIPA is added to the reaction cement (solution of reactants and polymer) either simultaneously with or immediately after the addition of the alkali metal stopping agents. Although the TIPA may be added in pure form, it is more conveniently added as a blend or a true solution, in a hydrocarbon diluent. This last procedure, particularly where the TIPA is in true solution in the hydrocarbon diluent, insures a faster and more complete dispersion of the TIPA into the polymer cement. Suitable solvents or blending mediums for TIPA may be selected from the same hydrocarbon diluents used in the system or may be selected from one of the monomers used in the system. For example, isoprene has been successfully used since it forms a true solution with TIPA.

When used in conjunction with the alkali metal stopping agents to improve the color of the finished polymer, the quantity of TIPA added to the reaction cement is based on the amount of polymer present at the time of chain termination. The amount of polymer present at this time is tantamount to the yield of the system. The yield is determined on a quantity of the reactor cement by coagulating the polymer and reporting the polymer yield as percent solids.

Although there is no lower or upper limit on the amount of TIPA added, sufficient quantity must be added to effect an improvement in the color of the finished polymer. An addition of TIPA larger than the quantity needed to effect an improvement in polymer color would represent an economic waste. Large excesses of added TIPA may adversely affect the cure rate of the polymer when it is later compounded with vulcanizing ingredients. Experience indicates that a TIPA addition of between about 0.05 to about 0.20 parts of TIPA per one hundred parts of polymer gives the desired improvements in color with an addition of 0.10 parts TIPA per one hundred parts polymer being preferred. Laboratory data shows that addition of TIPA within the above limits has no significant effect on the cure rate of the polymer.

The practice of this invention is further described and illustrated by reference to the following examples which are intended to be illustrative rather than restrictive.

EXAMPLE I

Polyisoprene was prepared in the manner described elsewhere in this application, by polymerizing isoprene, while dissolved in hexane, by using a catalyst comprising titanium tetrachloride and aluminum triisobutyl diphenyl etherate in amounts so that the Al/Ti mol ratio was approximately 0.85/1 and the amount of total catalyst employed was approximately 0.5 parts per hundred parts of isoprene. This polymerization was conducted at approximately 100° F. and was run continuously. At the end of the desired polymerization to a number of samples of the polyisoprene was added 4.0 mols of sodium methoxide per mol of titanium employed in the catalyst, along with varying amounts of triisopropanolamine (TIPA as a stopper. The amount of TIPA added per hundred parts of polyisoprene rubber is given in the following table. To each of these samples was added one part of 2,6-ditertiarybutylparacresol per 100 parts of polyisoprene as an antioxidant. The polyisoprene was isolated and dried in the conventional manner.

The polymer samples were formulated as follows:

|  | Parts by weight |
|---|---|
| Polyisoprene | 100 |
| Dicumyl peroxide | 0.5 |

The compounded polymer was press-cured, for 15 minutes at 320° F. at approximately 1,200 p.s.i., into sheets which were approximately 0.075 inch thick.

Color values of these cured polyisoprene sheets were compared and measured on a Gardner Automatic Difference Meter. The various color values and the TIPA concentrations of each sample are given in the table below. In the Gardner instrument, the various color values are read directly from the instrument and are described as follows:

(1) R$d$: This is a measure of the reflectance of total light. The higher the R$d$ value, the more nearly white the material being measured is.

(2) $a$: The $a$ value is a measure of the green and red color components. The intensity of the green component is identified by a positive (+) number and the higher the number, the higher the green intensity. The red color component is identified by a negative (−) number and the higher the number, the higher the red intensity.

(3) $b$: The $b$ value is a measurement of the blue and yellow color components. The blue intensity is identified by a negative number (−) and the yellow intensity is identified by a positive number (+). The lighter the color, the lower the positive numbers.

TABLE 1.—GARDNER COLOR VALUES

| Sample No. | Triisopropanolamine concentration, phr. | Gardner color values | | |
|---|---|---|---|---|
| | | R$d$ (1) | $a$ (2) | $b$ (3) |
| 60324 F1 | 0 | 36.7 | +2.2 | +28.6 |
| 60324 F3g | 0 | 38.4 | +1.7 | +26.5 |
| 60325 F1 | 0 | 35.7 | +2.7 | +26.8 |
| Avg | | 36.9 | +2.2 | +27.3 |
| 60326 F2g | 0.05 | 56.4 | −1.4 | +20.7 |
| 60327 F2 | 0.05 | 63.4 | −2.0 | +14.6 |
| 60328 G2 | 0.05 | 48.1 | −0.5 | +25.4 |
| Avg | | 55.9 | −1.3 | +20.2 |
| 60329 | 0.075 | 45.1 | −0.4 | +27.2 |
| 60330 G1 | 0.10 | 56.3 | −1.6 | +19.9 |
| 60331 F1 | 0.10 | 60.7 | −2.8 | +15.4 |
| 60402 F1 | 0.10 | 63.6 | −2.9 | +16.3 |
| 60403 F3 | 0.10 | 62.0 | −2.1 | +13.0 |
| 60406 F3 | 0.10 | 64.9 | −2.4 | +16.9 |
| Avg | | 61.5 | −2.4 | +16.3 |
| 60404 F1 | 0.15 | 66.4 | −1.7 | +13.5 |
| 60404 F2 | 0.15 | 65.1 | −1.6 | +13.9 |
| Avg | | 65.7 | −1.7 | +13.6 |

EXAMPLE II

In order to determine the effect of triisopropanolamine on cure rate, samples containing no TIPA, 0.05, 0.075, 0.10, and 0.15 part of TIPA per hundred of rubber were compounded in the following formula:

|  | Parts by weight |
|---|---|
| Polyisoprene | 100.00 |
| HAF black | 45.00 |
| Stearic acid | 2.00 |
| Zinc oxide | 3.00 |
| Butylated reaction products of p-cresol and dicyclopentadiene | 0.50 |
| Sulfur | 2.00 |
| N-tert.-butyl-2-benzothiazole sulfenamide | 0.80 |

A Mooney scorch test MS at 270° F. was determined. No difference in the Mooney scorch could be determined as a result of the varying concentrations of TIPA in the polyisoprene samples.

Samples were also press-cured at 270° F. at approximately 1,200 p.s.i. Conventional physical properties such as tensile, elongation, modulus and hardness of these samples were determined. There was no difference in any of these tests which indicate the state of cure is changed due to the various concentrations of TIPA in the polyisoprene. Thus, it was concluded that TIPA had no effect on the finished polymer.

While certain representative embodiments and details have been shown for the purpose of illustrating the invention, it will be apparent to those skilled in this art that various changes and modifications may be made therein without departing from the spirit or scope of the invention.

What is claimed is:

1. In a process for polymerizing a 2-alkyl-1,3-butadiene to form a high cis 1,4-poly-2-alkyl-1,3-butadiene polymer which comprises contacting a 2-alkyl-1,3-butadiene while in an inert solvent and under polymerization conditions with a catalyst system selected from the group consisting of (1) a mixture of titanium tetrachloride and an organoaluminum compound and (2) a mixture of titanium tetrachloride and an organoaluminum aromatic etherate, the mole ratio of aluminum/titanium ranges from 0.6/1 to 1.5/1, the improvement comprising stopping the chain growth reaction by the addition of a mixture of (A) triisopropanolamine, ranging between about 0.05 to about 0.20 part per hundred parts of poly-2-alkyl substituted 1,3-butadiene, and (B) at least one chain stopper selected from the group consisting of alkali metal alcoholates and alkali metal hydroxides, ranging from about 2 to about 6 moles per mole of titanium, thereby producing a light-colored, sunlight stable, high cis-1,4-poly-2-alkyl-1,3-butadiene and recovering the same.

2. The process according to claim 1 wherein the alkali metal alcoholate is sodium methoxide.

3. A process according to claim 1 wherein the catalyst employed in the polymerization is a mixture of titanium tetrachloride and an aluminum trialkyl.

4. A process according to claim 1 wherein the catalyst employed in the polymerization is a mixture of titanium tetrachloride and an organoaluminum aromatic etherate.

5. A method according to claim 4 in which the organoaluminum aromatic etherate is an organoaluminum diphenyl etherate.

6. A method according to claim 4 in which the organoaluminum aromatic etherate is a methyl phenyl etherate.

7. A method according to claim 4 in which in the polymerization catalyst the mol ratio of aluminum/titanium ranges from 0.6/1 to 1.5/1 and in which the amount of chain stopper ranges from 2 to about 6 mols of chain stopper per mol of titanium and in which the triisopropanolamine ranges between about 0.05 to about 0.20 part per hundred parts of poly-2-alkyl substituted 1,3-butadiene.

8. The method according to claim 7 in which the chain stopper is sodium methoxide.

References Cited

UNITED STATES PATENTS 3,047,559   7/1962   Mayor et al. _____ 260—94.3
3,180,858   4/1965   Farrar _____ 260—94.3

JOSEPH L. SCHOFER, Primary Examiner

R. A. GAITHER, Assistant Examiner

U.S. Cl. X.R.

260—801, 814